(12) United States Patent
Aistrope et al.

(10) Patent No.: US 10,404,643 B2
(45) Date of Patent: Sep. 3, 2019

(54) UNDELIVERABLE RESPONSE HANDLING IN ELECTRONIC MAIL SYSTEMS

(71) Applicant: Microsoft Technology Licensing, LLC, Redmond, WA (US)

(72) Inventors: Damien Paul Aistrope, Seattle, WA (US); Zann St. Pierre, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 145 days.

(21) Appl. No.: 15/617,397

(22) Filed: Jun. 8, 2017

(65) Prior Publication Data

US 2018/0359208 A1    Dec. 13, 2018

(51) Int. Cl.
| | |
|---|---|
| *H04L 12/58* | (2006.01) |
| *G06F 16/31* | (2019.01) |
| *G06F 16/33* | (2019.01) |
| *G06Q 10/10* | (2012.01) |

(52) U.S. Cl.
CPC ............ *H04L 51/28* (2013.01); *G06F 16/316* (2019.01); *G06F 16/334* (2019.01); *G06Q 10/107* (2013.01); *H04L 51/30* (2013.01)

(58) Field of Classification Search
CPC ........ G06F 17/30619; G06F 17/30675; G06Q 10/107; H04L 51/28; H04L 51/30
See application file for complete search history.

(56) References Cited

U.S. PATENT DOCUMENTS

| | | | | |
|---|---|---|---|---|
| 6,775,691 | B1* | 8/2004 | Kubik | H04L 51/30 709/206 |
| 7,406,504 | B2 | 7/2008 | Paul | |
| 8,468,348 | B1* | 6/2013 | Wasserman | H04L 51/12 713/168 |
| 9,202,218 | B1* | 12/2015 | Crisman | G06Q 30/00 |
| 2002/0042815 | A1* | 4/2002 | Salzfass | H04L 51/14 709/206 |
| 2002/0087639 | A1* | 7/2002 | Quine | G06Q 10/107 709/206 |
| 2002/0087640 | A1* | 7/2002 | Quine | H04L 51/28 709/206 |
| 2002/0087647 | A1* | 7/2002 | Quine | G06Q 10/107 709/206 |
| 2002/0138581 | A1* | 9/2002 | MacIntosh | G06Q 10/107 709/206 |

(Continued)

OTHER PUBLICATIONS

Jennings, Jeanne, "Do Not Reply to This Email", https://www.clickz.com/do-not-reply-to-this-email/80287/, Published on: Sep. 1, 2014, 15 pages.

(Continued)

*Primary Examiner* — Jerry B Dennison

(57) ABSTRACT

Systems, methods, apparatuses, and software for electronic mail systems and service in computing environments are provided herein. In one example, an electronic mail (email) messaging service is provided that identifies inbound email messages that include inactive sender addresses, processes the inactive sender addresses against suggestion information compiled based at least in part on monitored email replies related to the inactive sender addresses, and surfaces one or more suggested reply addresses for use in composing reply email messages in response to the inbound email messages.

20 Claims, 4 Drawing Sheets

(56) References Cited

U.S. PATENT DOCUMENTS

| | | | |
|---|---|---|---|
| 2003/0005064 A1 | 1/2003 | Mcdowell et al. | |
| 2003/0101226 A1* | 5/2003 | Quine | G06Q 10/107 709/206 |
| 2003/0115279 A1* | 6/2003 | Quine | H04L 51/28 709/207 |
| 2003/0115280 A1* | 6/2003 | Quine | H04L 29/1215 709/207 |
| 2005/0066005 A1* | 3/2005 | Paul | G06Q 10/107 709/206 |
| 2007/0271345 A1 | 11/2007 | Callanan et al. | |
| 2007/0288575 A1* | 12/2007 | Gillum | G06Q 10/107 709/206 |
| 2008/0034432 A1 | 2/2008 | Bohannon et al. | |
| 2009/0024706 A1* | 1/2009 | Janakiraman | G06Q 10/107 709/206 |
| 2009/0204973 A1* | 8/2009 | Allen | G06F 9/547 719/310 |
| 2011/0099607 A1* | 4/2011 | Cohen | H04L 63/123 726/3 |
| 2012/0117036 A1* | 5/2012 | Lester | G06Q 10/109 707/692 |
| 2013/0091143 A1* | 4/2013 | Raemy | G06Q 10/06395 707/748 |
| 2016/0099904 A1 | 4/2016 | Agathangelos | |
| 2018/0359208 A1* | 12/2018 | Aistrope | H04L 51/28 |

OTHER PUBLICATIONS

"About Bounces", http://kb.mailchimp.com/accounts/compliance-tips/about-bounces, Retrieved on: Mar. 28, 2007, 2 pages.

"Do not respond to this email!", http://www.returncustomer.com/do-not-respond-to-this-email/, Retrieved on: Mar. 28, 2007, 4 pages.

Byther, Tim, "Email-To-Case auto-response does not allow "no-reply" address", https://success.salesforce.com/answers?id=90630000000D6FyAAK, Retrieved on: Mar. 28, 2007, 2 pages.

B, Seth, "Do Not Reply—The best way to tell customers you DGAF.", http://subimage.com/blog/2013/12/05/do-not-reply-means-you-dgaf/, Published on: Dec. 5, 2013, 11 pages.

Metcalfe, Harry, "Automatic emails: Please don't reply", https://www.dxw.com/2009/01/automatic-emails-please-dont-reply/, Published on: Jan. 27, 2009, 3 pages.

"How to Change the Reply-To Address on a Notification Email", https://support.formstack.com/customer/portal/articles/1249640, Retrieved on: Mar. 28, 2007, 2 pages.

"Microsoft Outlook", Retrieved From https://en.wikipedia.org/w/index.php/?title=Microsoft_Outlook&oldid=780851226, May 17, 2017, 10 Pages.

"Simple Mail Transfer Protocol", Retrieved From https://en.wikipedia.org/w/index_php?title=Simple_Mail_Transfer_Protocol&oldid=780931200, May 18, 2017, 11 Pages.

Alistair, et al., "Linux Email", In Publication—Packt Publishing Ltd., Nov. 11, 2009, 130 Pages.

Jaap, Wesselius, "Pro Exchange Server 2013 Administration", In Apress L. P., Dec. 23, 2013, 295 Pages.

"Email", Internet Article, Retrieved From https://en.wikipedia.org/w/index.php?title=Email&oldid=783441937, Jun. 2, 2017, 8 Pages.

"International Search Report and Written Opinion Issued in PCT Application No. PCT/US18/031926", dated Jun. 27, 2018, 11 Pages.

\* cited by examiner

UNDELIVERABLE RESPONSE HANDLING IN ELECTRONIC MAIL SYSTEMS

BACKGROUND

Networked messaging platforms have become popular for transferring communications between users, such as electronic mail (email), instant messaging, text messaging, or other messaging technologies. These messaging platforms can be provided for end users to draft or compose various messages and create conversation-threaded communications for interaction with one or more users. Users can interact with the messaging systems through graphical interfaces and user applications that are employed on smartphones, computers, laptops, tablets, gaming systems, and the like.

The networked messaging platforms typically use standardized identities, such as email addresses in the "local-id@domain" format, to identify users or other entities that are reachable through the messaging platforms as well as indicating a corresponding server, organization, or service. At times, inactive or unmonitored email addresses might be employed by entities when sending out emails to various users or parties. These unmonitored email addresses might take the form of "no-reply@domain" style of email addresses, among others, that are employed as standardized sender addresses. Often, when large corporations send mass emails such as notifications, statements or bills, they are sent from such a "no-reply@" or unmanned inbox. Sending entities might choose to employ these unmonitored addresses in e-commerce situations or customer interaction scenarios to preclude recipient replies to the unmonitored email addresses. This makes it difficult for users to reply to such emails or get support—often sending the users away from the email client to search contact pages or corporate websites.

OVERVIEW

Systems, methods, apparatuses, and software for electronic mail systems and service in computing environments are provided herein. In one example, an electronic mail (email) messaging service is provided that identifies inbound email messages that include inactive sender addresses, processes the inactive sender addresses against suggestion information compiled based at least in part on monitored email replies related to the inactive sender addresses, and surfaces one or more suggested reply addresses for use in composing reply email messages in response to the inbound email messages.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
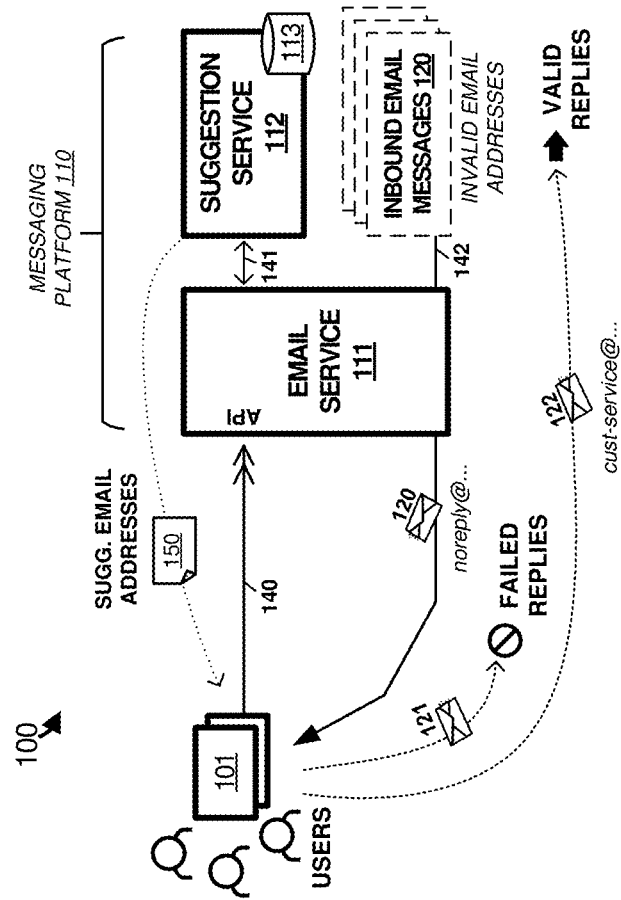
FIG. 1 illustrates a messaging environment in an implementation.

Networked messaging platforms, such as electronic mail (email) systems, instant messaging platforms, text messaging, or other messaging technologies, allow one or more users to compose various messages and communications for interaction with one or more users. Users and client systems can send and receive many messages with other users that might be spread over a large geographic area, such as different countries and regions across the globe. Standardized identities are typically employed, such as email addresses in the "local-id@domain" format (i.e. john@contoso.com), to identify users or entities that are reachable through the messaging platforms as well as indicating a corresponding server, organization, or service. At times, inactive or unmonitored email addresses might be employed by entities when sending out emails to various users or parties. These inactive or unmonitored email addresses might take the form of "no-reply@domain" style of email addresses (i.e. no_reply@contoso.com), among others. If users attempt to use the inactive email addresses, an associated email handling system can generate bounce reports or undeliverability notifications that are indicated to the sending users. Users are thus faced with difficulty in communicating with entities and organizations that employ these inactive or unmonitored email addresses.

In the examples below, enhanced operation for email systems is provided. These enhancements include services that monitor over time for bounce reports or undeliverability information among various email addresses. These services can accumulate successful activity into data structures that relate the inactive email addresses to corresponding active or alternative email addresses. When users are presented with inbound emails that include these email addresses that correspond to inactive or undeliverable mailboxes, then one or more suggested alternative email addresses can be presented to the users. Technical effects include increased user productivity by presenting intelligently derived email address alternatives in email applications based on other user activity, and reducing user need to switch to other applications or perform manual searches. Moreover, decreased network or email service workloads can be achieved by reducing volumes of bounceback email traffic or undeliverable report handling by email systems or network equipment. Thus, more efficient usage computing/processing resources of email handling systems is achieved, as well as reduced network infrastructure workloads.

Networked messaging platforms, such as Microsoft Exchange®, among others, can be employed to implement the enhanced features discussed herein. Thus, more efficient usage of the email handling resources of the network messaging platforms is achieved. Moreover, the network messaging platforms can be arranged to include purely 'online' environments, such as web-based, cloud-hosted, or distributed computing-hosted environments. These network messaging platform arrangements can also include on-premises arrangements where customers or organizations have physical or virtual machines on-site at various locations. These arrangements can also include hybrid arrangements where both online or hosted environments and on-premises environments are employed.

As a first example of enhanced network messaging, FIG. 1 is presented. FIG. 1 is a system diagram that includes network messaging environment 100. Environment 100 includes user systems 101 and messaging platform 110. Not shown in FIG. 1 for clarity are various originating email systems that create and transfer emails that include inactive or unmonitored email addresses. However, inbound email messages 120 represent these emails which are initiated/transferred by the originating email systems over link 142 for receipt into email system 111. User system 101 and messaging platform 110 communicate over at least link 140. Messaging platform 110 includes email service 111 and suggestion service 112 which communicate over link 141.

In operation, originating systems generate and transfer email messages directed to any users associated with user systems 101. User systems 101 receive email services through email service 111, such as mailbox services, calendar services, collaboration services, among others. Each email message can include from: (sender) addresses, to: (recipient) addresses, message subject and body content, as well as other addressees including cc: (carbon copy) addresses and bcc: (blind carbon copy) addresses. The sender addresses might comprise inactive or unmonitored email addresses. These inactive or unmonitored email addresses typically do not provide for a recipient to respond to the inactive or unmonitored email addresses. When a recipient does attempt to respond to the inactive or unmonitored email addresses, the email messages are typically 'bounced back' or returned as undeliverable to the now-sender (i.e. original recipient).

Figure 2:
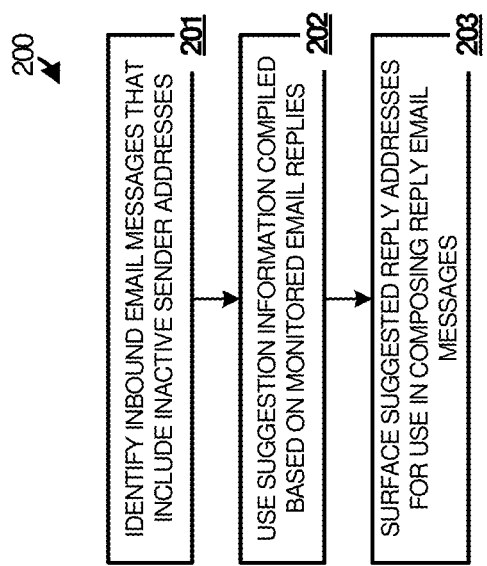
FIG. 2 illustrates an address suggestion process in an implementation.

FIG. 2 details an example process for providing enhanced email services to users that encounter inactive or unmonitored email addresses. FIG. 2 includes operations 200 that describe one example operation of environment 100. In FIG. 2, email service 111 identifies (201) inbound email messages 120 that include inactive sender addresses. The inbound email messages can be delivered to users associated with user devices 101, and can include "sender" addresses that correspond to inactive or unmonitored mailboxes or accounts. These inactive sender addresses can be identified based on pattern matching, exact matching of sender identities or sender@domain identities, or based upon past activity correlation. The pattern matching can include matching to predetermined email addresses or identities, such as no-reply@, donotreply@, or other email addresses, including various variations and permutations based thereon. Past activity correlation can include when messaging platform 110 tracks undeliverable or bounced email messages from one or more users over a period of time, and determines that the associated email addresses correspond to inactive mailboxes or unmonitored mailboxes, among others.

Suggestion service 112 can then process the inactive sender addresses against suggestion information compiled based at least in part on monitored email replies related to the inactive sender addresses, and uses (202) suggestion information compiled based on monitored email replies. This suggestion information can be stored in one or more data structures 113, such as databases, structured lists, or other data structures. The suggestion information can be determined over time based on activity of users of messaging platform 110, such as how other users handled inactive or unmonitored email addresses in the past. For example, if users encountered no-reply@contoso.com and responsive to undeliverable reports or bounce reports that occur from failed email reply/sending attempts 121, these activities can be included in the suggestion information. Subsequent email messaging to similar domains (i.e. contoso.com) can then be correlated to the undeliverable or bounced email attempts in the suggestion information for later use. Statistical correlations, machine learning techniques, and other processes can be employed to correlate undeliverable/bounced email activity to subsequent successful email activity for similar domain names Once one or more suggested email addresses are determined, then suggestion service 112 surfaces (203) suggested reply addresses 150 for use in composing reply email messages 122 in response to the inbound email messages. Suggestion service 112 can surface the suggested reply addresses in several ways. In an example, suggestion service 112 surfaces the suggested reply addresses via user interface elements, such as a popup dialog box, user alert, user canvas informational element, or other elements. A user might employ a user application local to user device 101, and the suggested reply addresses can be received by user device 101 and presented in the user application, such as in a user canvas or email application of the user device. An email composition window might indicate one or more suggested reply addresses to replace a current or auto-filled email address that was determined based on the sender address. When a user interfaces with email service 111 through a web interface or browser interface, then suggestion information can be embedded in an email service web page provided by email service 111. When a user interfaces with email service 111 through a mobile application or app on a smartphone or tablet device, then a local application can indicate the suggested email addresses, or present one or more options for replacing a current reply address with one or the suggested addresses.

An end user composing an email, such as a reply to an email that included the inactive email address, can elect to include the suggested address as a recipient instead of inactive address. The user interface elements might provide this replacement with a single-click or a drag-and-drop operation to populate a to: field in a message composition user interface canvas, or instead a user might be able to copy and paste the suggested address into a to: field, among other options.

Returning to a discussion of the elements of FIG. 1, user systems 101 can comprise any number of end user systems, such as terminals, computing devices, tablet devices, smartphones, personal computers, servers, cloud-based systems, distributed computing platforms, and the like. Users of a communication platform or automated systems, can compose messages, transfer messages, and receive messages, such as email. User systems 101 each include one or more network interfaces, such as network interface cards, wireless interfaces, optical networking interfaces, and the like, over which email messages can be composed, viewed upon receipt, and transfer initiated. User systems 101 can include hardware and software elements to interface with an email service/platform using web interfaces, terminal interfaces, console interfaces, shell interfaces, APIs, graphical user interface, textual user interface, among other user interfaces, including combinations thereof. In some examples, user systems 101 comprise applications, virtualized app containers, scripting software, email identifier databases, among other elements.

Messaging platform 110 includes one or more instances of email service 111 and suggestion service 112, among other elements. Messaging platform 110 comprises server based or distributed computing based messaging services and platforms, such as email messaging platforms, chat platforms, or instant messaging platforms, among others. Messaging platform 110 can include communication interfaces, network interfaces, processing systems, computer systems, microprocessors, storage systems, storage media, or some other processing devices or software systems, and can be distributed among multiple devices or across multiple geographic locations. Examples of messaging platform 110 can include software such as an operating system, logs, databases, utilities, drivers, networking software, and other software stored on a computer-readable medium. Messaging platform 110 can comprise one or more platforms which are hosted by a distributed computing system or cloud-computing service. Messaging platform 110 can comprise logical interface elements, such as software defined interfaces and Application Programming Interfaces (APIs). Messaging platform 110 can include one or more user interfaces, such as graphical user interfaces, web interfaces, APIs, terminal interfaces, console interfaces, command-line shell interfaces, extensible markup language (XML) interfaces, among others.

Email service 111 and suggestion service 112 each comprises server based or distributed computing based messaging services and platforms, such as email messaging platforms, chat platforms, or instant messaging platforms, among others. Email service 111 and suggestion service 112 can each include communication interfaces, network interfaces, processing systems, computer systems, microprocessors, storage systems, storage media, or some other processing devices or software systems, and can be distributed among multiple devices or across multiple geographic locations. Examples of email service 111 and suggestion service 112 can each include software such as an operating system, logs, databases, utilities, drivers, networking software, and other software stored on a computer-readable medium. Email service 111 and suggestion service 112 can each comprise one or more platforms which are hosted by a distributed computing system or cloud-computing service. Email service 111 and suggestion service 112 can each comprise logical interface elements, such as software defined interfaces and Application Programming Interfaces (APIs). Email service 111 and suggestion service 112 can each include one or more user interfaces, such as graphical user interfaces, web interfaces, APIs, terminal interfaces, console interfaces, command-line shell interfaces, extensible markup language (XML) interfaces, among others.

Links 140-142 can each comprise one or more communication links, such as one or more network links comprising wireless or wired network links. Links 140-142 can comprise various logical, physical, or application programming interfaces. Example communication links can use metal, glass, optical, air, space, or some other material as the transport media. Links 140-142 can use various communication protocols, such as Internet Protocol (IP), Ethernet, hybrid fiber-coax (HFC), synchronous optical networking (SONET), asynchronous transfer mode (ATM), Time Division Multiplex (TDM), circuit-switched, communication signaling, wireless communications, or some other communication format, including combinations, improvements, or variations thereof. Links 140-142 can include direct links or may include intermediate networks, systems, or devices, and can include a logical network link transported over multiple physical links. Links 140-142 can include routers, switches, bridges, traffic handling nodes, and the like for transporting traffic among endpoints.

Figure 3:
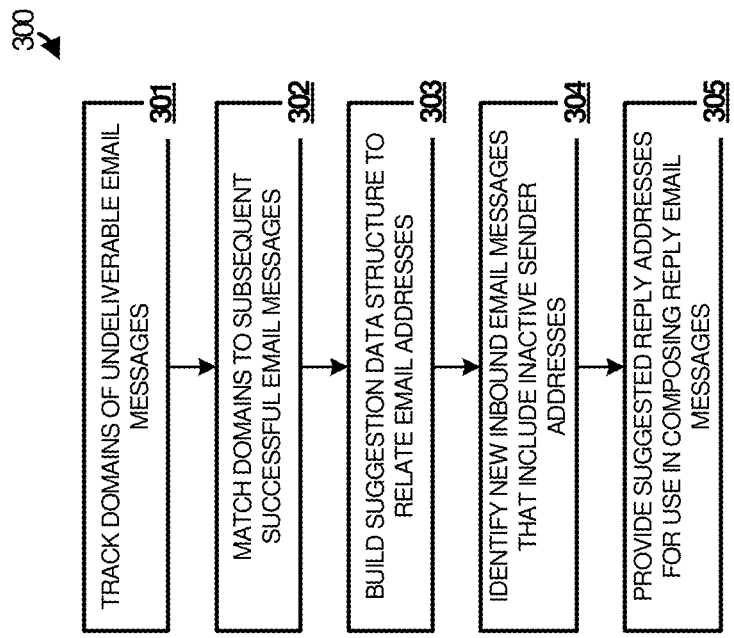
FIG. 3 illustrates an address suggestion process in an implementation.

FIG. 3 details a further example process for providing enhanced email services to users that encounter inactive or unmonitored email addresses. FIG. 3 includes operations 300 that describe one example operation of environment 100. In FIG. 3, suggestion service 112 tracks (301) domains of undeliverable email messages for one or more users of email service 111. These undeliverable email messages can be monitored for past activity of email service 111, and tracked in one or more data structures, such as element 113, which might include a database. The undeliverable emails can be identified in various ways, such as by detecting undeliverable notifications received in response to email messages sent by users to various email addresses. Responsive to monitored email message activity, if a corresponding undeliverability notification is received, then recipient email addresses used in the email messages can be determined to be unmonitored or inactive. The undeliverability notifications can comprise bounce reports, Non-Delivery Reports (NDR) receipts, Failed Delivery Status Notification (DSN) messages, or Non-Delivery Notifications (NDN), among other email system messaging and control indicators.

Suggestion service 112 compiles matched pairs of addresses of unsuccessful email messages to addresses of subsequent successful email messages. Suggestion service 112 can match (302) domains among addresses of unsuccessful email messages and addresses of subsequent successful email messages, such as "contoso.com" or other domains. Suggestion service 112 then builds (303) one or more suggestion data structures to relate addresses of unsuccessful email messages and addresses of subsequent successful email messages. Various matching/paring techniques can be employed, such as statistical accumulation of successful email messages subsequent to related unsuccessful email messages, machine learning techniques to determine successful email messages subsequent to related unsuccessful email messages, as well as various matching techniques to correlate domain names or other email address components or network addressing among various user attempts to reply to email messages.

Matching and/or scoring can be employed on inbound email addresses to discover potential matches in data structures 113. For example, a domain of an inbound email address might correspond to "customer-service@domain" and "bob@domain" from previous successful email activity. However, more frequent use of "customer-service@domain" can be used to statistically derive that "customer-service@domain" is preferred over "bob@domain" for suggestions, or to rank "bob@domain" lower than "customer-service@domain" when presenting suggestions to a user. In further examples, known contacts or user contacts from user contact lists or address books can be employed to determine suggested addresses based on shared or common domain names as the inbound email addresses. In yet further examples, administrators or email system operations might designate one or more predetermined suggestion addresses for users to be presented with based at least on shared or common domain names as the inbound email addresses.

Figure 4:
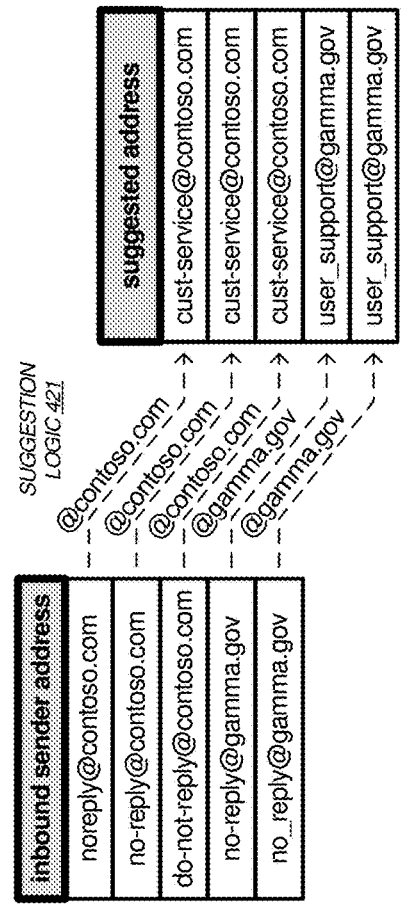
FIG. 4 illustrates an example suggestion data structure in an implementation.

One example data structure is shown in FIG. 4, namely suggestion database 410 as an example of data structures 113. An identifier is used to uniquely identify each row of the database that includes corresponding pairs of unsuccessful email addresses to successful email addresses. Database 410 can be arranged according to domain names of the email addresses, and in some instances many different unsuccessful addresses can correspond to the same successful address, such as when an entity or organization uses many different unmonitored or inactive email addresses to reach customers or users, while maintaining a centralized customer service mailbox.

Once suggestion service 112 has established relationships between domain names and email addresses of successful email messages, then various processing logic 420 can be applied to further inbound email messages. Over time, suggestion service 112 can establish more accurate suggestions as more email activity is monitored. Suggestion service 112 identifies (304) new inbound email messages that include inactive sender addresses, as found in database 410 or data structures 113. Suggestion service 112 can identify the inbound email messages that include the inactive sender addresses by matching at least a portion of the inbound email messages to information of a suggestion database 410 comprising at least the portion of the inactive sender addresses. Suggestion service 112 can match portions of the inactive sender addresses to at least portions of previously encountered undeliverable email addresses included in database 410. In some examples, suggestion service 112 can then process the inactive sender addresses against the suggestion information by matching email address domains included in the suggestion data structure to domains of the inbound email messages, and determine one or more suggested reply addresses based in part on matching of the domains of the inbound email messages.

Suggestion service 112 then provides (305) suggested reply addresses for use in composing reply email messages. These suggested reply addresses can be used by users in replying to the associated email addresses. In some examples, actual email addresses are presented to users, such as local-id@domain.com. However, in further examples, a hyperlink or URL is presented to users that is used to auto-populate a message with the suggested reply address or initiates an email assistance window to provide the reply address therein. In further examples, a user interface can present an informational bar alert below or above the inactive email address in a message composition window and suggest known active accounts that may be of use to a user. Other surfacing of the suggested reply addresses can be achieved. Suggestion service 112 itself or suggestion service 112 through interaction with email service 111 can provide the suggested reply addresses 150 for delivery to a user interface system configured to present the one or more suggested reply addresses to users. Within the user interfaces associated with the users, selections can be made among the suggested reply addresses to replace inactive sender addresses in reply email messages.

Figure 5:
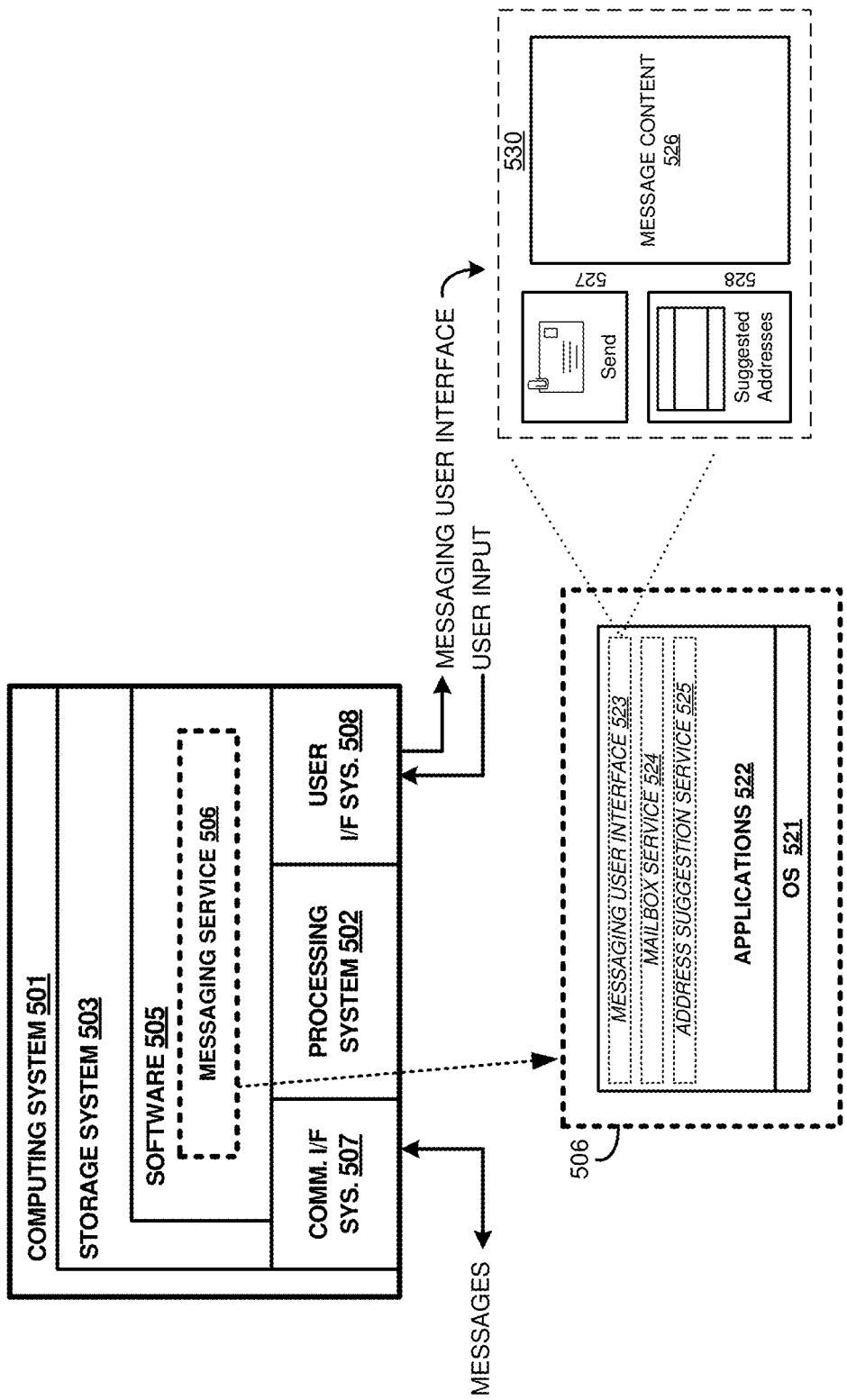
FIG. 5 illustrates a computing system suitable for implementing any of the architectures, processes, and operational scenarios disclosed herein.

FIG. 5 illustrates computing system 501 that is representative of any system or collection of systems in which the various operational architectures, scenarios, and processes disclosed herein may be implemented. For example, computing system 501 can be used to implement any of the elements of FIG. 1, such as email service 111, suggestion service 112, or elements of user systems 101 of FIG. 1.

Examples implemented by computing system 501 include, but are not limited to, server computers, cloud computing systems, distributed computing systems, software-defined networking systems, computers, desktop computers, hybrid computers, rack servers, web servers, cloud computing platforms, and data center equipment, as well as any other type of physical or virtual server machine, and other computing systems and devices, as well as any variation or combination thereof. When portions of computing system 501 are implemented on user devices, example devices include smartphones, laptop computers, tablet computers, desktop computers, gaming systems, entertainment systems, and the like.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 508. Processing system 502 is operatively coupled with storage system 503, communication interface system 507, and user interface system 508.

Processing system 502 loads and executes software 505 from storage system 503. Software 505 includes messaging service 506, which is representative of the processes, services, and platforms discussed with respect to the preceding Figures. When executed by processing system 502 to provide enhanced messaging services, including identifying inbound email messages with inactive or undeliverable email addresses, determining suggestion email addresses to replace the inactive or undeliverable email addresses, and surfacing the suggestions to users, among other services, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and processing circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced messaging services, including identifying inbound email messages with inactive or undeliverable email addresses, determining suggestion email addresses to replace the inactive or undeliverable email addresses, and surfacing the suggestions to users, among other services.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software or other application software, in addition to or that include messaging service 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to provide enhanced messaging services, including identifying inbound email messages with inactive or undeliverable email addresses, determining suggestion email addresses to replace the inactive or undeliverable email addresses, and surfacing the suggestions to users, among other services. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Messaging service 506 includes one or more software elements, such as OS 521 and applications 522. Applications 522 can receive user or device input, such as email application user interaction and address suggestion selection, through user interface system 508. Applications 522 can include messaging user interface 523, mailbox service 524, and address suggestion service 525, or other applications/services which can provide enhanced messaging services. These elements can describe various portions of computing system 501 with which a user interacts. For example, OS 521 can provide a software platform on which user application is executed and allows for receipt and monitoring of input from user interface system 508 and delivery of information and other content over communication interfaces.

Applications 522 can be related to any messaging platform discussed herein, such as productivity, messaging, electronic mail, instant messaging, network chat, network messaging, or other messaging and communication applications, and optionally includes user interface elements which can be manipulated by a user. In one example, messaging user interface 523 provides an interface, such as a web interface, programming interface, sockets interface, API, or other interface for interacting with client systems or users. Messaging user interface 523 receives requests for email retrieval, email sending, and mailbox information retrieval, among other requests. Mailbox service 524 can receive user email on behalf of the users and store the emails for later retrieval by users. Mailbox service 524 can provide other services, such as calendaring services, collaboration services, and communication services in addition to email services. Address suggestion service 525 processes past activity of users of mailbox service 524 to track email addresses corresponding to undeliverable or inactive email accounts/addresses from other incoming or inbound email messages, as well as follow-up successful email messages from users to similar or same domains. Address suggestion service 525 determines suggested email addresses to use in place of sender addresses, to be employed by users in reply emails. Address suggestion service 525 can store information related to these undeliverable or inactive email accounts/addresses as well as information related to suggested email addresses in one or more data structures on storage system 503 or other storage systems.

In one example, messaging user interface 523 includes graphical user interface 530 that further includes message content view 526, message send user interface element 527, and message suggested addresses user interface element 528. Messaging user interface 523 handles user presentation of receipt and transfer of messages and attachments. Messaging user interface 523 can present composition user interface views as well as received messages and attachments to users, such as through user interface system 508. When a user desires to send a message that is composed using messaging user interface 523, the user can select to send or to send with a suggested recipient address, as indicated by elements 527 and 528, respectively. Message content 526 can comprise a message editor and include several user interface elements, which can comprise command line, graphical, or web-based user interface elements, among others.

Communication interface system 507 may include communication connections and devices that allow for communication with other computing systems (not shown) over communication networks (not shown). Examples of connections and devices that together allow for inter-system communication may include network interfaces, network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 508 can receive input and provide output over a network interface, such as communication interface system 507. In network examples, user interface system 508 might include web interfaces and terminal interfaces. User interface system 508 can packetize display or graphics data for remote display by a display system or computing system coupled over one or more network interfaces or web interfaces. Physical or logical elements of user interface system 508 can provide alerts or visual outputs to users or other operators. User interface system 508 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface. In further examples, user interface system 508 may include a touchscreen, keyboard, mouse, voice input device, audio input device, or other touch input device for receiving input from a user. Output devices such as a display, speakers, web interfaces, terminal interfaces, and other types of output devices may also be included in user interface system 508.

Communication between computing system 501 and other computing systems, may occur over a communication network or networks and in accordance with various communication protocols, combinations of protocols, or variations thereof. Examples network include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1

A method of operating an electronic mail (email) messaging service, the method comprising identifying inbound email messages that include inactive sender addresses, processing the inactive sender addresses against suggestion information compiled based at least in part on monitored email replies related to the inactive sender addresses, and surfacing one or more suggested reply addresses for use in composing reply email messages in response to the inbound email messages.

Example 2

The method of Example 1, where identifying the inbound email messages that include the inactive sender addresses comprises matching at least a portion of the inbound email messages to information of a suggestion data structure comprising at least the portion of the inactive sender addresses.

Example 3

The method of Examples 1-2, where processing the inactive sender addresses against the suggestion information comprises matching email address domains included in the suggestion data structure to domains of the inbound email messages and determining the one or more suggested reply addresses based in part on matching of the domains of the inbound email messages.

Example 4

The method of Examples 1-3, where the suggestion data structure comprises a plurality of suggestion email addresses identified as successfully delivered subsequent to one or more unsuccessful email attempts and correlated in the suggestion data structure according to at least domain names in common among corresponding pairs of the plurality of suggestion email addresses and the one or more unsuccessful email attempts.

Example 5

The method of Examples 1-4, where identifying the inbound email messages that include the inactive sender addresses comprises at least matching portions of the inactive sender addresses to at least portions of previously encountered undeliverable email addresses.

Example 6

The method of Examples 1-5, further comprising determining the previously encountered undeliverable email addresses based in part on at least one of bounce reports, undeliverable message information, non-delivery receipts, and non-delivery notifications.

Example 7

The method of Examples 1-6, where surfacing the one or more suggested reply addresses comprises generating one or more suggested email addresses or uniform resource locators (URLs) that correspond to the one or more suggested reply addresses, and transferring the one or more suggested email addresses or the URLs for delivery to a user interface system configured to present the one or more suggested reply addresses to users.

Example 8

The method of Examples 1-7, where surfacing the one or more suggested reply addresses comprises presenting the one or more suggested reply addresses in user interfaces from which users can choose selected suggested reply addresses to replace inactive sender addresses in reply email messages.

Example 9

A computing apparatus comprising one or more computer readable storage media, a processing system operatively coupled with the one or more computer readable storage media, and program instructions stored on the one or more computer readable storage media. When executed by the processing system, the program instructions direct the processing system to at least identify inbound email messages that include inactive sender addresses, process the inactive sender addresses against suggestion information compiled based at least in part on monitored email replies related to the inactive sender addresses, and surface one or more suggested reply addresses for use in composing reply email messages in response to the inbound email messages.

Example 10

The computing apparatus of Example 9, comprising further program instructions, when executed by the processing system, direct the processing system to at least identify the inbound email messages that include the inactive sender addresses by at least matching at least a portion of the inbound email messages to information of a suggestion data structure comprising at least the portion of the inactive sender addresses.

Example 11

The computing apparatus of Examples 9-10, comprising further program instructions, when executed by the processing system, direct the processing system to at least process the inactive sender addresses against the suggestion information by at least matching email address domains included in the suggestion data structure to domains of the inbound email messages and determining the one or more suggested reply addresses based in part on matching of the domains of the inbound email messages.

Example 12

The method of Examples 9-11, where the suggestion data structure comprises a plurality of suggestion email addresses identified as successfully delivered subsequent to one or more unsuccessful email attempts and correlated in the suggestion data structure according to at least domain names in common among corresponding pairs of the plurality of suggestion email addresses and the one or more unsuccessful email attempts.

Example 13

The computing apparatus of Examples 9-12, comprising further program instructions, when executed by the processing system, direct the processing system to at least identify the inbound email messages that include the inactive sender addresses by at least matching portions of the inactive sender addresses to at least portions of previously encountered undeliverable email addresses.

Example 14

The computing apparatus of Examples 9-13, comprising further program instructions, when executed by the processing system, direct the processing system to at least determine the previously encountered undeliverable email addresses based in part on at least one of bounce reports, undeliverable message information, non-delivery receipts, and non-delivery notifications.

Example 15

The computing apparatus of Examples 9-14, comprising further program instructions, when executed by the processing system, direct the processing system to at least surface the one or more suggested reply addresses by at least generating one or more suggested email addresses or uniform resource locators (URLs) that correspond to the one or more suggested reply addresses, and transferring the one or more suggested email addresses or the URLs for delivery to a user interface system configured to present the one or more suggested reply addresses to users.

Example 16

The computing apparatus of Examples 9-15, comprising further program instructions, when executed by the processing system, direct the processing system to at least surface the one or more suggested reply addresses by at least presenting the one or more suggested reply addresses in user interfaces from which users can choose selected suggested reply addresses to replace inactive sender addresses in reply email messages.

Example 17

An network messaging platform, comprising an electronic mail (email) service configured to receive inbound email messages directed to one or more users of the email service, and a suggestion service configured to determine ones of the inbound email messages that include sender addresses corresponding to unmonitored addresses, process at least domain information of the sender addresses to determine one or more suggested reply addresses for use in composing reply email messages in response to the inbound email messages instead of the sender addresses, and surface the one or more suggested reply addresses to the one or more users of the email service.

Example 18

The network messaging platform of Example 17, where the suggestion information is compiled based at least in part on monitoring email replies of the one or more users of the email service responsive to ones of the inbound email messages that include the sender addresses corresponding to the unmonitored addresses.

Example 19

The network messaging platform of Examples 17-18, the suggestion service further configured to identify the inbound email messages that include the sender addresses corresponding to the unmonitored addresses by at least matching portions of the sender addresses to at least portions of addresses of previously encountered undeliverable email messages determined from delivery notifications associated with the undeliverable email messages.

Example 20

The network messaging platform of Examples 17-19, the suggestion service configured to transfer the one or more suggested reply addresses for display by user interfaces associated with the one or more users, where the one or more users can choose selected suggested reply addresses to replace associated sender addresses in reply email messages The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method of operating an electronic mail (email) messaging service, the method comprising:
    identifying inbound email messages that include inactive sender addresses;
    processing the inactive sender addresses against suggestion information compiled based at least in part on monitored email replies related to the inactive sender addresses; and
    surfacing one or more suggested reply addresses for use in composing reply email messages in response to the inbound email messages.

2. The method of claim 1, wherein identifying the inbound email messages that include the inactive sender addresses comprises matching at least a portion of the inbound email messages to information of a suggestion data structure comprising at least the portion of the inactive sender addresses.

3. The method of claim 2, wherein processing the inactive sender addresses against the suggestion information comprises matching email address domains included in the suggestion data structure to domains of the inbound email messages and determining the one or more suggested reply addresses based in part on matching of the domains of the inbound email messages.

4. The method of claim 2, wherein the suggestion data structure comprises a plurality of suggestion email addresses identified as successfully delivered subsequent to one or more unsuccessful email attempts and correlated in the suggestion data structure according to at least domain names in common among corresponding pairs of the plurality of suggestion email addresses and the one or more unsuccessful email attempts.

5. The method of claim 1, wherein identifying the inbound email messages that include the inactive sender addresses comprises at least matching portions of the inactive sender addresses to at least portions of previously encountered undeliverable email addresses.

6. The method of claim 5, further comprising:
    determining the previously encountered undeliverable email addresses based in part on at least one of bounce reports, undeliverable message information, non-delivery receipts, and non-delivery notifications.

7. The method of claim 1, wherein surfacing the one or more suggested reply addresses comprises generating one or more suggested email addresses or uniform resource locators (URLs) that correspond to the one or more suggested reply addresses, and transferring the one or more suggested email addresses or the URLs for delivery to a user interface system configured to present the one or more suggested reply addresses to users.

8. The method of claim 1, wherein surfacing the one or more suggested reply addresses comprises presenting the one or more suggested reply addresses in user interfaces from which users can choose selected suggested reply addresses to replace inactive sender addresses in reply email messages.

9. A computing apparatus comprising:
    one or more computer readable storage media;
    a processing system operatively coupled with the one or more computer readable storage media; and
    program instructions stored on the one or more computer readable storage media, that when executed by the processing system, direct the processing system to at least:
    identify inbound email messages that include inactive sender addresses;
    process the inactive sender addresses against suggestion information compiled based at least in part on monitored email replies related to the inactive sender addresses; and
    surface one or more suggested reply addresses for use in composing reply email messages in response to the inbound email messages.

10. The computing apparatus of claim 9, comprising further program instructions, when executed by the processing system, direct the processing system to at least:
    identify the inbound email messages that include the inactive sender addresses by at least matching at least a portion of the inbound email messages to information of a suggestion data structure comprising at least the portion of the inactive sender addresses.

11. The computing apparatus of claim 10, comprising further program instructions, when executed by the processing system, direct the processing system to at least:
    process the inactive sender addresses against the suggestion information by at least matching email address domains included in the suggestion data structure to domains of the inbound email messages and determining the one or more suggested reply addresses based in part on matching of the domains of the inbound email messages.

12. The method of claim 11, wherein the suggestion data structure comprises a plurality of suggestion email addresses identified as successfully delivered subsequent to one or more unsuccessful email attempts and correlated in the suggestion data structure according to at least domain names in common among corresponding pairs of the plurality of suggestion email addresses and the one or more unsuccessful email attempts.

13. The computing apparatus of claim 9, comprising further program instructions, when executed by the processing system, direct the processing system to at least:
    identify the inbound email messages that include the inactive sender addresses by at least matching portions of the inactive sender addresses to at least portions of previously encountered undeliverable email addresses.

14. The computing apparatus of claim 13, comprising further program instructions, when executed by the processing system, direct the processing system to at least:
    determine the previously encountered undeliverable email addresses based in part on at least one of bounce reports, undeliverable message information, non-delivery receipts, and non-delivery notifications.

15. The computing apparatus of claim 9, comprising further program instructions, when executed by the processing system, direct the processing system to at least:
    surface the one or more suggested reply addresses by at least generating one or more suggested email addresses or uniform resource locators (URLs) that correspond to the one or more suggested reply addresses, and transferring the one or more suggested email addresses or the URLs for delivery to a user interface system configured to present the one or more suggested reply addresses to users.

16. The computing apparatus of claim 9, comprising further program instructions, when executed by the processing system, direct the processing system to at least:

surface the one or more suggested reply addresses by at least presenting the one or more suggested reply addresses in user interfaces from which users can choose selected suggested reply addresses to replace inactive sender addresses in reply email messages.

17. An network messaging system, comprising:

an electronic mail (email) service configured to receive inbound email messages directed to one or more users of the email service;

a suggestion service comprising at least one processor configured to determine ones of the inbound email messages that include sender addresses corresponding to unmonitored addresses, process at least domain information of the sender addresses to determine one or more suggested reply addresses for use in composing reply email messages in response to the inbound email messages instead of the sender addresses, and surface the one or more suggested reply addresses to the one or more users of the email service.

18. The network messaging system of claim 17, wherein the suggestion information is compiled based at least in part on monitoring email replies of the one or more users of the email service responsive to ones of the inbound email messages that include the sender addresses corresponding to the unmonitored addresses.

19. The network messaging system of claim 17, comprising:

the suggestion service further configured to identify the inbound email messages that include the sender addresses corresponding to the unmonitored addresses by at least matching portions of the sender addresses to at least portions of addresses of previously encountered undeliverable email messages determined from delivery notifications associated with the undeliverable email messages.

20. The network messaging system of claim 17, comprising:

the suggestion service configured to transfer the one or more suggested reply addresses for display by user interfaces associated with the one or more users, wherein the one or more users can choose selected suggested reply addresses to replace associated sender addresses in reply email messages.

* * * * *